(12) United States Patent
Wang (10) Patent No.: US 7,712,389 B2
(45) Date of Patent: May 11, 2010

(54) LIFTING DEVICE HAVING PARALLEL DOUBLE SCREW RODS

(75) Inventor: Chia-Jung Wang, Xindian (TW)

(73) Assignee: T-Motion Technology Co., Ltd., Taipei (TW)

( * ) Notice: Subject to any disclaimer, the term of this patent is extended or adjusted under 35 U.S.C. 154(b) by 1030 days.

(21) Appl. No.: 11/383,629

(22) Filed: May 16, 2006

(65) Prior Publication Data

US 2007/0295126 A1  Dec. 27, 2007

(51) Int. Cl.
*F16H 3/06* (2006.01)
(52) U.S. Cl. .................. 74/89.23; 74/89.35; 254/98; 254/102
(58) Field of Classification Search ............ 74/89.23, 74/89.29, 89.34, 89.35, 89.37; 254/98, 102
See application file for complete search history.

(56) References Cited

U.S. PATENT DOCUMENTS

| | | | | |
|---|---|---|---|---|
| 1,748,948 A * | 3/1930 | Gassen | ........................ | 414/198 |
| 5,119,651 A * | 6/1992 | Yang | .......................... | 70/52 |
| 5,172,442 A * | 12/1992 | Bartley et al. | ................... | 5/611 |
| 5,937,699 A * | 8/1999 | Garrec | ......................... | 74/89.35 |
| 6,026,970 A * | 2/2000 | Sturm et al. | ................. | 212/348 |
| 6,382,039 B1 * | 5/2002 | Choi | ......................... | 74/89.35 |
| 6,513,398 B1 * | 2/2003 | Finkemeyer | ................ | 74/89.28 |
| 6,880,416 B2 * | 4/2005 | Koch | ........................... | 74/89.35 |
| 7,185,868 B2 * | 3/2007 | Wang | ........................... | 248/422 |
| 7,458,562 B1 * | 12/2008 | Chen et al. | .................. | 254/103 |
| 2002/0162410 A1 * | 11/2002 | Zimmerman | ............... | 74/89.35 |

FOREIGN PATENT DOCUMENTS

EP  1230872  6/2005

* cited by examiner

*Primary Examiner*—Richard W Ridley
*Assistant Examiner*—Matthew A Johnson
(74) *Attorney, Agent, or Firm*—Chun-Ming Shih (57) ABSTRACT

A lifting device having parallel double screw rods includes a motor, a first transmission and a second transmission. The first transmission includes a screw rod driven by the motor and a telescopic tube assembly threadedly connected to the screw rod and linearly movable relative to the screw rod. The distal end of the telescopic tube assembly is fixedly connected on a connecting piece. The second transmission is provided at one side of the first transmission and parallel thereto. Further, the second transmission includes a sleeve driven by the motor to rotate, a telescopic tube assembly accommodated within the sleeve and axially movable relative to the sleeve, and a screw rod threadedly connected to the telescopic tube assembly and linearly movable relative to the telescopic tube assembly. The distal end of the telescopic tube assembly is connected to the connecting piece. With the above arrangement, each screw rod is interchangeable and the cost can be reduced.

12 Claims, 9 Drawing Sheets

LIFTING DEVICE HAVING PARALLEL DOUBLE SCREW RODS

BACKGROUND OF THE INVENTION

1. Field of the Invention

The present invention relates to a lifting device having parallel double screw rods, and in particular to a lifting device mounted in the electric table or electric bed.

2. Description of Prior Art

Conventionally, a lifting device is provided within a two-stage sliding unit and then connected to an electric table or electric bed, so that the higher or lower position of the electric table or electric bed can be adjusted. Since the total length of the extension of the lifting device does not exceed the sum of two sliding units and the total length of the retraction is not lower than the length of any one longer sliding unit, the extension and retraction stroke that is possibly achieved is limited and thus cannot satisfy the requirement for a larger adjusting space in the existing market. Therefore, there is proposed a multiple-stage (such as three-stage or four-stage) sliding unit. In addition to have a larger amount of extension and a shorter amount of retraction than those of the two-stage sliding unit, the moving speed of extension or retraction of the multiple-stage sliding unit is also faster. Thus, it is an important issue for those skilled in this art to provide a connecting structure having a lifting device and a multiple-stage sliding unit.

In a conventional lifting device having a screw rod, as disclosed in EP1230872, the three-stage lifting device comprises a driving means, a first transmission means and a second transmission means. The first transmission means comprises a cylindrical screw rod and a nut driven by the driving means. The inside and outside of the cylindrical screw rod are provided with inner and outer threads, respectively. The outer thread is threadedly connected to the nut. The second transmission means and the first transmission means are provided in series. The second transmission means has a pillared screw rod threadedly connected with the inner thread of the cylindrical screw rod, so that the cylindrical screw rod can move linearly relative to the nut and the cylindrical screw rod at the same time. Further, with the transmission of the driving means, each sliding unit can slide relative to each other.

However, in practical use, the conventional lifting device of screw rod has still some problems as follows. Since the primary members such as the cylindrical screw rod and the pillared screw rod are manufactured separately, those elements cannot be interchangeable, so that the total cost of the elements cannot be reduced efficiently. Further, the inside and outside of the cylindrical screw rod are provided with threads, the machining process is very complicated and difficult. Also, after the machining process, it is not easy to perform the heat treatment to obtain a good surface hardness. As a result, it is very fast to generate wear between the cylindrical screw rod and the pillared screw rod, causing the increase in the subsequent cost for maintenance and inconvenience in use.

In view of the above, the inventor proposes the present invention to overcome the above problems based on his expert experiences and deliberate researches.

SUMMARY OF THE INVENTION

The primary object of the present invention is to provide a lifting device having parallel double screw rods, in which the parallel arrangement of each screw rod makes it interchangeable, so that the machining and heat treatment of the primary members are simplified and the cost can be efficiently reduced.

In order to achieve the above objects, the present invention provides a lifting device having parallel double screw rods, which comprises a driving means, a first transmission means and a second transmission means. The first transmission means comprises a screw rod driven by the driving means and a telescopic tube assembly threadedly connected to the screw rod and linearly movable relative to the screw rod. The distal end of the telescopic tube assembly is fixedly connected on a connecting piece. The second transmission means is provided at one side of the first transmission means and parallel thereto. Further, the second transmission means comprises a sleeve driven by the driving means to rotate, a telescopic tube assembly accommodated within the sleeve and axially movable relative to the sleeve, and a screw rod threadedly connected to the telescopic tube assembly and linearly movable relative to the telescopic tube assembly. On end of the telescopic tube assembly is connected to the connecting piece of the first transmission means. The driving means simultaneously drives the telescopic tube assembly of the first transmission means and the telescopic tube assembly and the screw rod of the second transmission means to protrude or retract relative to the driving means.

In order to achieve the above objects, the present invention provides a lifting device having parallel double screw rods, which comprises a driving means, a first transmission means and a second transmission means. The first transmission means comprises a screw rod driven by the driving means and a telescopic tube assembly threadedly connected to the screw rod and linearly movable relative to the screw rod. The distal end of the telescopic tube assembly is fixedly connected on a connecting piece. The second transmission means is provided at one side of the first transmission means and parallel thereto. Further, the second transmission means comprises a sleeve driven by the driving means to rotate, a telescopic tube assembly accommodated within the sleeve and axially movable relative to the sleeve, and a screw rod threadedly connected to the telescopic tube assembly and linearly movable relative to the telescopic tube assembly. On end of the telescopic tube assembly is connected to the connecting piece of the first transmission means. The driving means simultaneously drives the telescopic tube assembly of the first transmission means and the telescopic tube assembly and the screw rod of the second transmission means to protrude or retract relative to the driving means.

DETAILED DESCRIPTION OF THE INVENTION

The characteristics and the technical contents of the present invention will be described with reference to the following detailed description and the accompanying drawings. However, it should be understood that the drawings are illustrative but not used to limit the scope of the present invention.

With reference to FIGS. 1 to 4, the present invention provides a lifting device having parallel double screw rods. The lifting device is connected respectively to a first sliding unit 5, a second sliding unit 6 and a third sliding unit 7 interconnecting with each other so as to control the relative sliding movement among each sliding unit 5, 6, 7. The lifting device comprises a driving means 10, a first transmission means 20 and a second transmission means 30. The driving means 10 is fixedly connected to the bottom of the first sliding unit 5, and it comprises a motor 11 and a base body 12 for fixedly accommodating the motor 11. A transmission shaft 111 protrudes outwardly from the center of the motor 11. The transmission shaft 111 in this embodiment is a worm. The base body 12 is constituted of an upper casing plate 121 fixedly connected to the bottom of the first sliding unit 5 and a lower casing plate 122 covered under the upper casing plate 121.

The first transmission means 20 comprises a screw rod 21, a first gear 22, a telescopic tube assembly 23 and a connecting piece 24. On end of the screw rod 21 penetrates into the base body 12 of the driving means 10 and is fixed on the base body 12 via a bearing or shaft sleeve. The first gear 22 can be a worm gear, and it is connected to one end of the screw rod 21 to rotate with the screw rod 21. The first gear 22 is driven by means of the transmission shaft 111 of the driving means 10. The telescopic tube assembly 23 comprises a telescopic tube 231 and a nut 232 fixedly connected to one end of the telescopic tube 231. The nut 232 is threadedly connected on the screw rod 21 to drive the telescopic tube assembly 23 to linearly move relative to the screw rod 21. The other end of the telescopic tube 231 is fixedly connected to the distal end of the second sliding unit 6 via a connecting piece 24.

Figure 4:
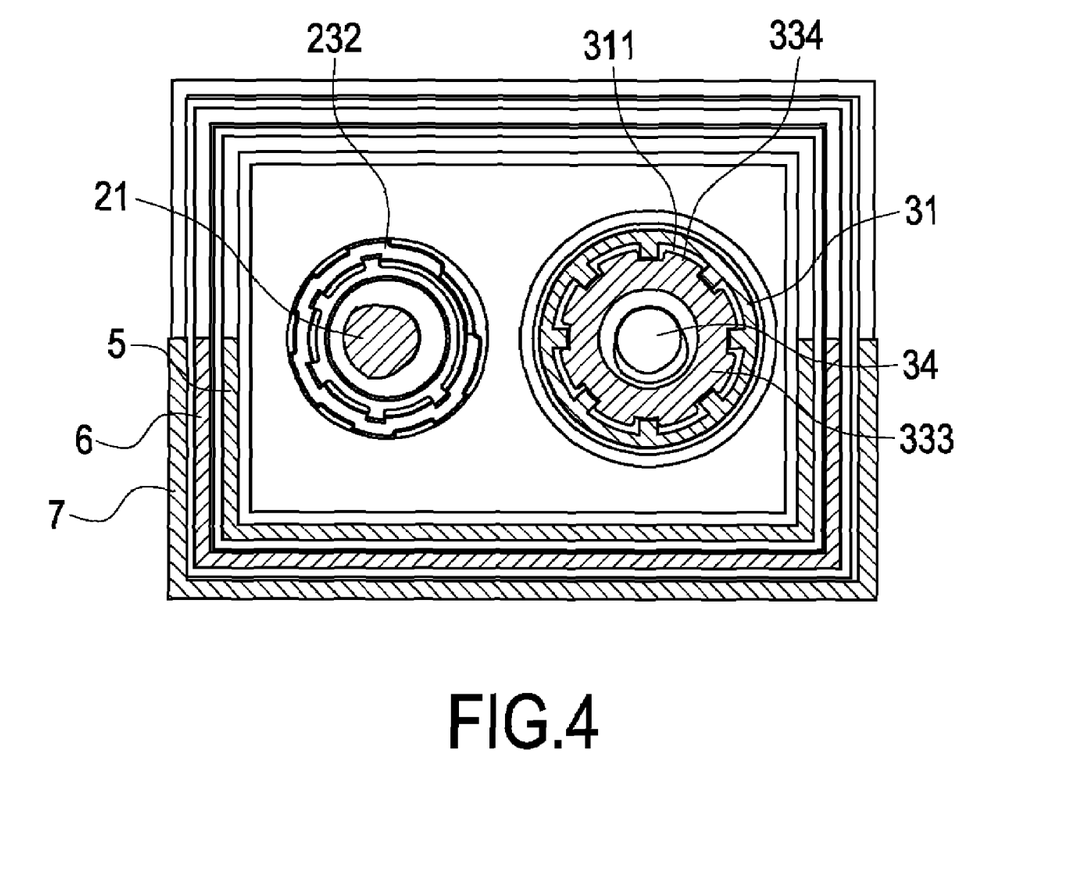
FIG. 4 is a cross-sectional along the line 4-4 in FIG. 3.

The second transmission means 30 is provided at one side of the first transmission means 20 and is parallel thereto. The second transmission means comprises a sleeve 31, a second gear 32, a telescopic tube assembly 33, a screw rod 34 and a connecting rod 35. The bottom of the sleeve 31 is connected to one end of the connecting rod 35. The other end of the connecting rod 35 is connected to the second gear 32, and is fixedly accommodated within the base body 12 of the driving means 10 via a lower bearing 36. The second gear 32 can be a worm gear. The second gear 32 of the second transmission means 30 and the first gear 22 of the first transmission means 20 are simultaneously engaged with and thus transmitted by the transmission shaft 111 of the driving means 10, so that the sleeve 31 can rotate relative to the first sliding unit 5. Further, an inner wall of the sleeve 31 is provided with a plurality of guiding grooves 311 parallel to each other (as shown in FIG. 4).

Figure 1:
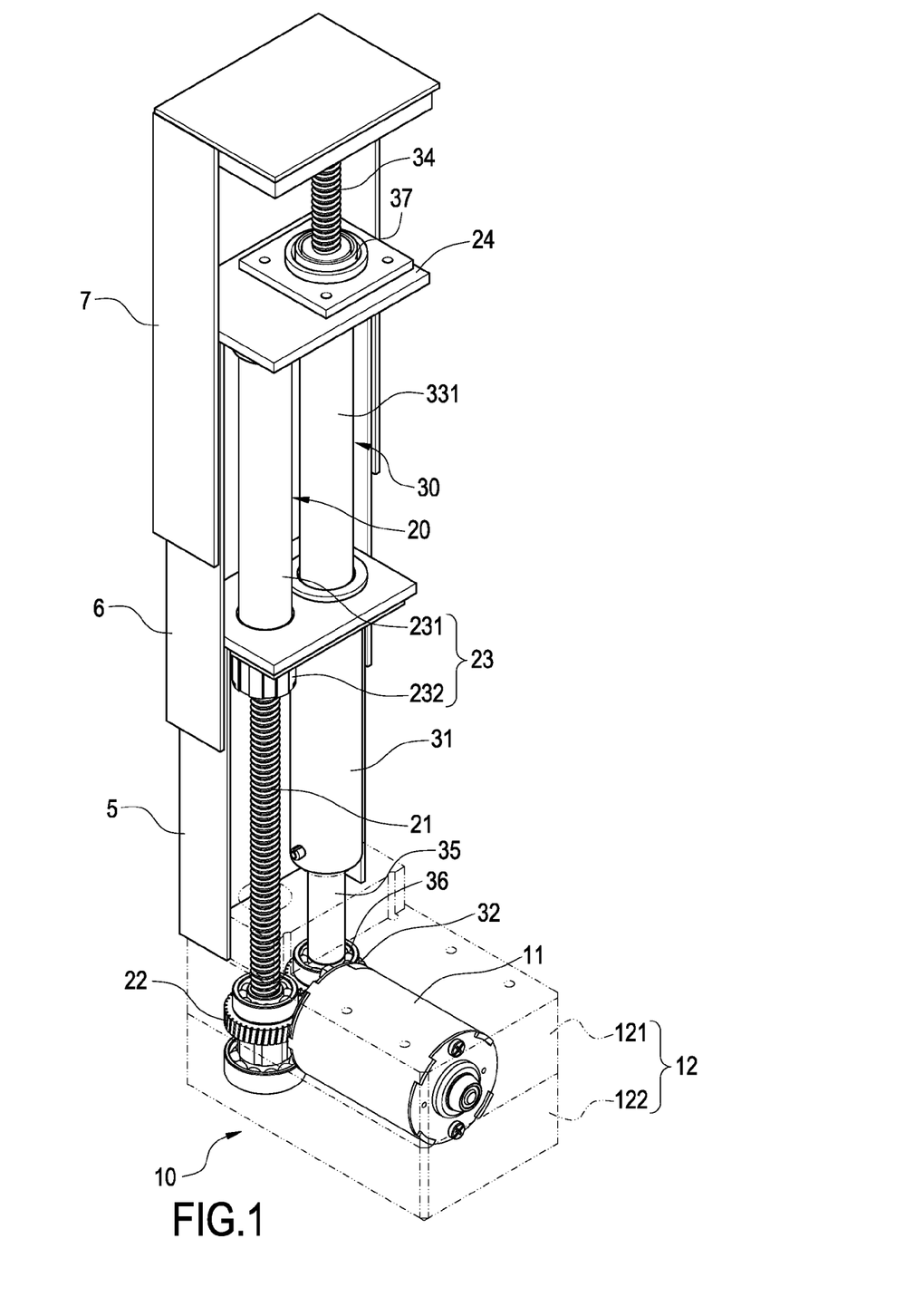
FIG. 1 is an assembled view showing the external appearance of the first embodiment of the present invention.
Figure 2:
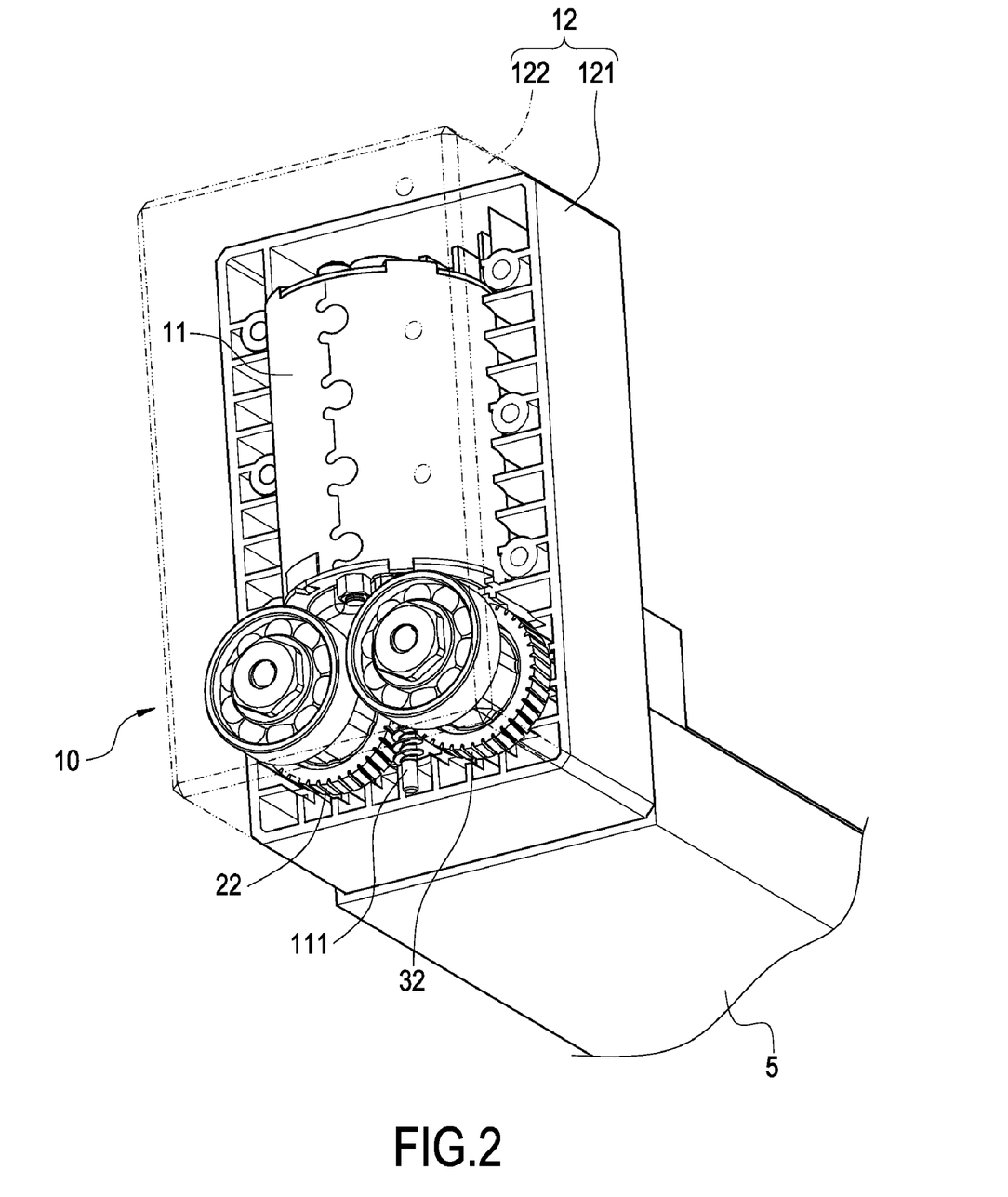
FIG. 2 is a schematic assembled view showing the bottom of the driving means of the first embodiment of the present invention.
Figure 3:
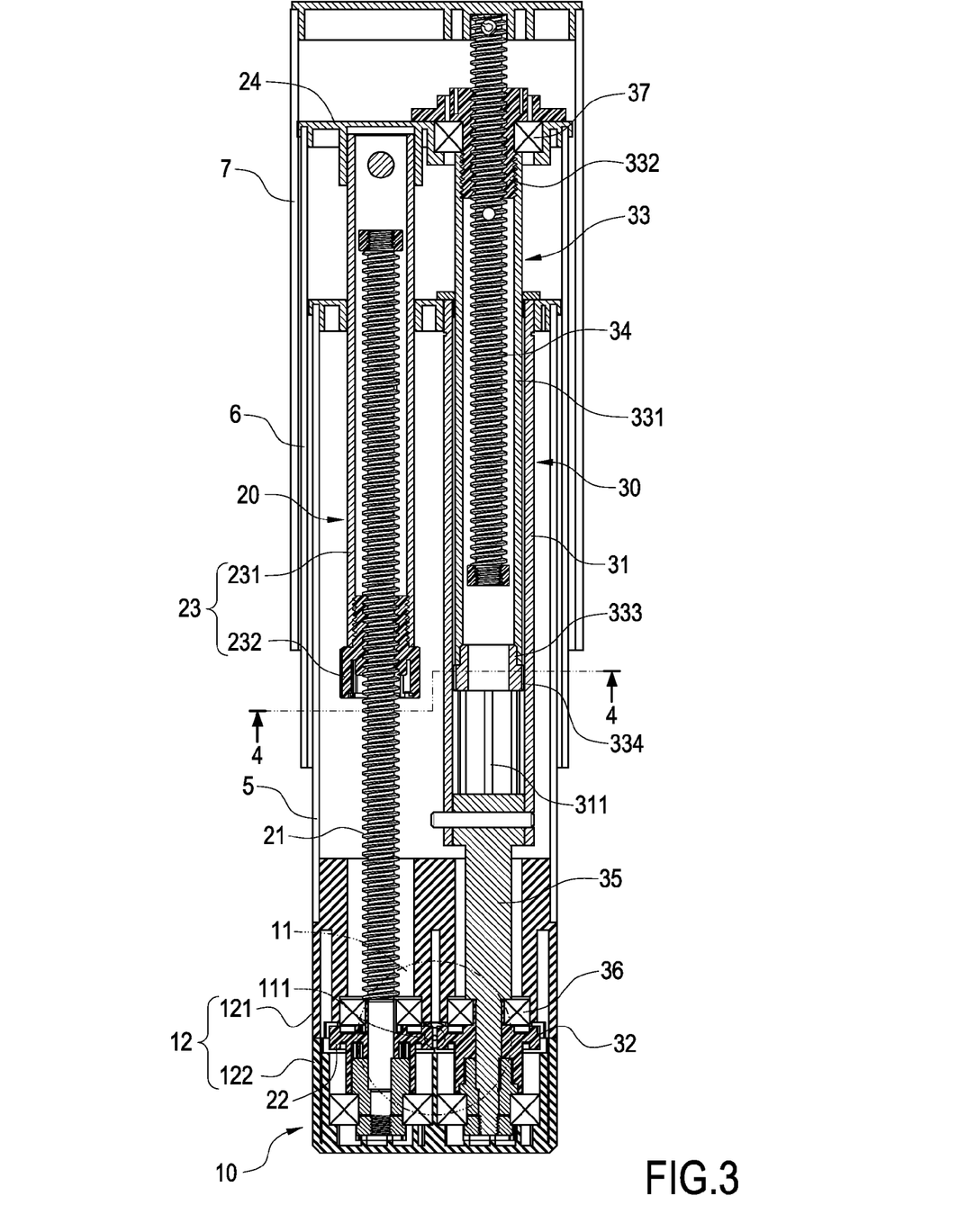
FIG. 3 is a longitudinal cross-sectional view showing the assembling of the first embodiment of the present invention.

The telescopic tube assembly 33 comprises a telescopic tube 331, a nut 332 and a positioning plug 333. The nut 332 and the positioning plug 333 are fixedly connected to both ends of the telescopic tube 331. The nut 332 is fixed on the connecting piece 24 of the first transmission means 20 via an upper bearing 37. The outer periphery of the positioning plug 333 is provided with a plurality of guiding rails 334 for slidably mating with the guiding grooves 311. The guiding rails 334 are non-rotatable relative to the guiding grooves 311, so as to make the telescopic tube assembly 33 be rotatable with the sleeve 31. The screw rod 34 is threadedly connected with the nut 332 of the telescopic tube assembly 33. Further, the rotation of the telescopic tube assembly 33 can drive the screw rod 34 to linearly move relative to telescopic tube assembly. A distal end of the screw rod 34 is fixedly connected on the third sliding unit 7.

Figure 5:
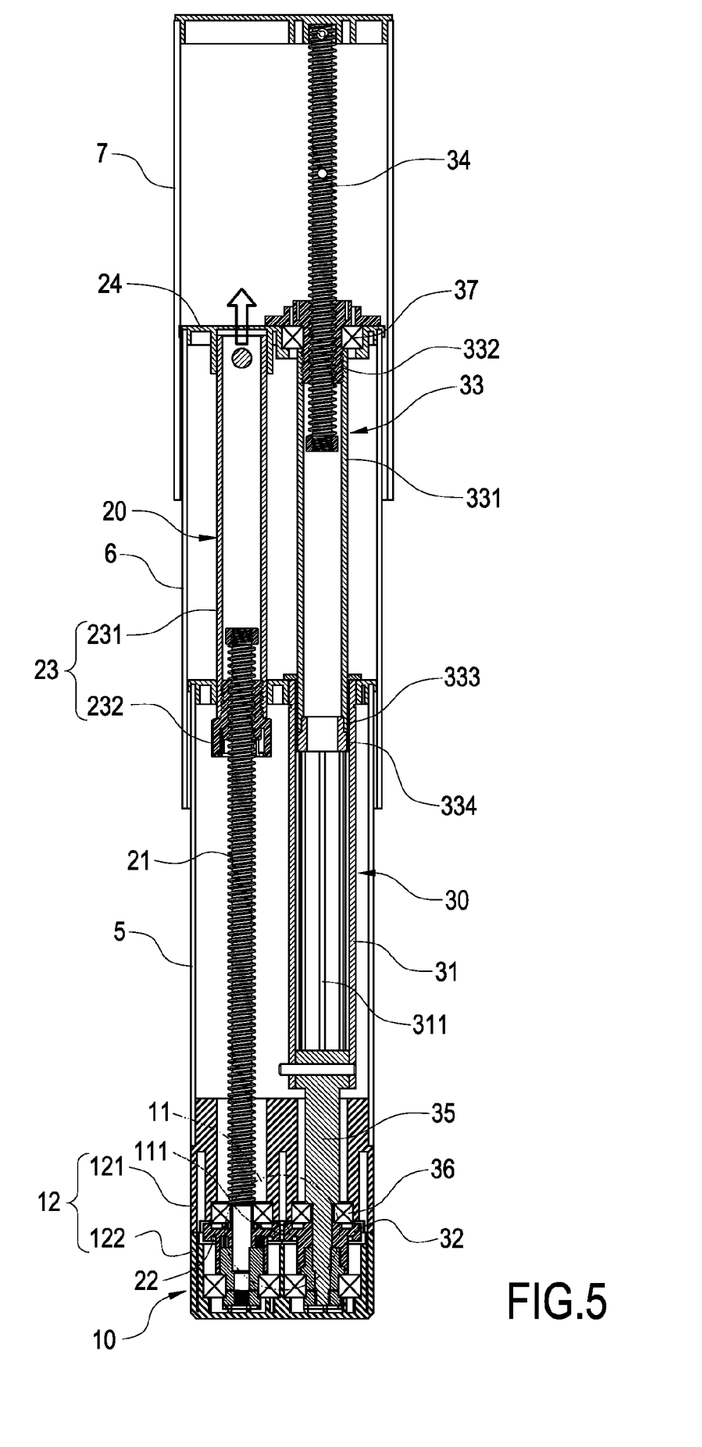
FIG. 5 is a cross-sectional view showing the using state of the first embodiment of the present invention.

With reference to FIG. 5, it is a cross-sectional view showing the using state of the first embodiment of the present invention. The lifting device of the present invention can be mounted on an electric table or an electric bed. In use, the rotation of the transmission shaft 111 of the motor 11 simultaneously drives the screw rod 21 of the first transmission means 20 and the connecting rod 35 of the second transmission means 20 to rotate. The screw rod 21 can make the telescopic tube assembly 23 threadedly connected to the screw rod to linearly protrude, so that the connecting piece 24 fixedly connected to the distal end of the telescopic tube 231 and the second sliding unit 6 can protrude relative to the first sliding unit 5. Further, the connecting rod 35 drives the sleeve 31 of the second transmission means 30 to rotate. With the guiding engagement between each guiding groove 311 of the sleeve 31 and each guiding rail 334 of the positioning plug 333, the telescopic tube assembly 33 can axially move relative to the sleeve 31 when the telescopic 33 rotates together with the sleeve 31. Moreover, since the screw rod 34 of the second transmission means 30 is threadedly connected on the nut 332 of the telescopic tube assembly 33, and the distal end of the screw rod 34 is fixedly connected on the third sliding unit 7, the rotation of the nut 332 can simultaneously drive the distal end of the screw rod 34 and the third sliding unit 7 to protrude. On the contrary, with the reverse rotation of the motor 11, the second sliding unit 6 and the third sliding unit 7 can be driven to retract relative to the first sliding unit 5.

Figure 6:
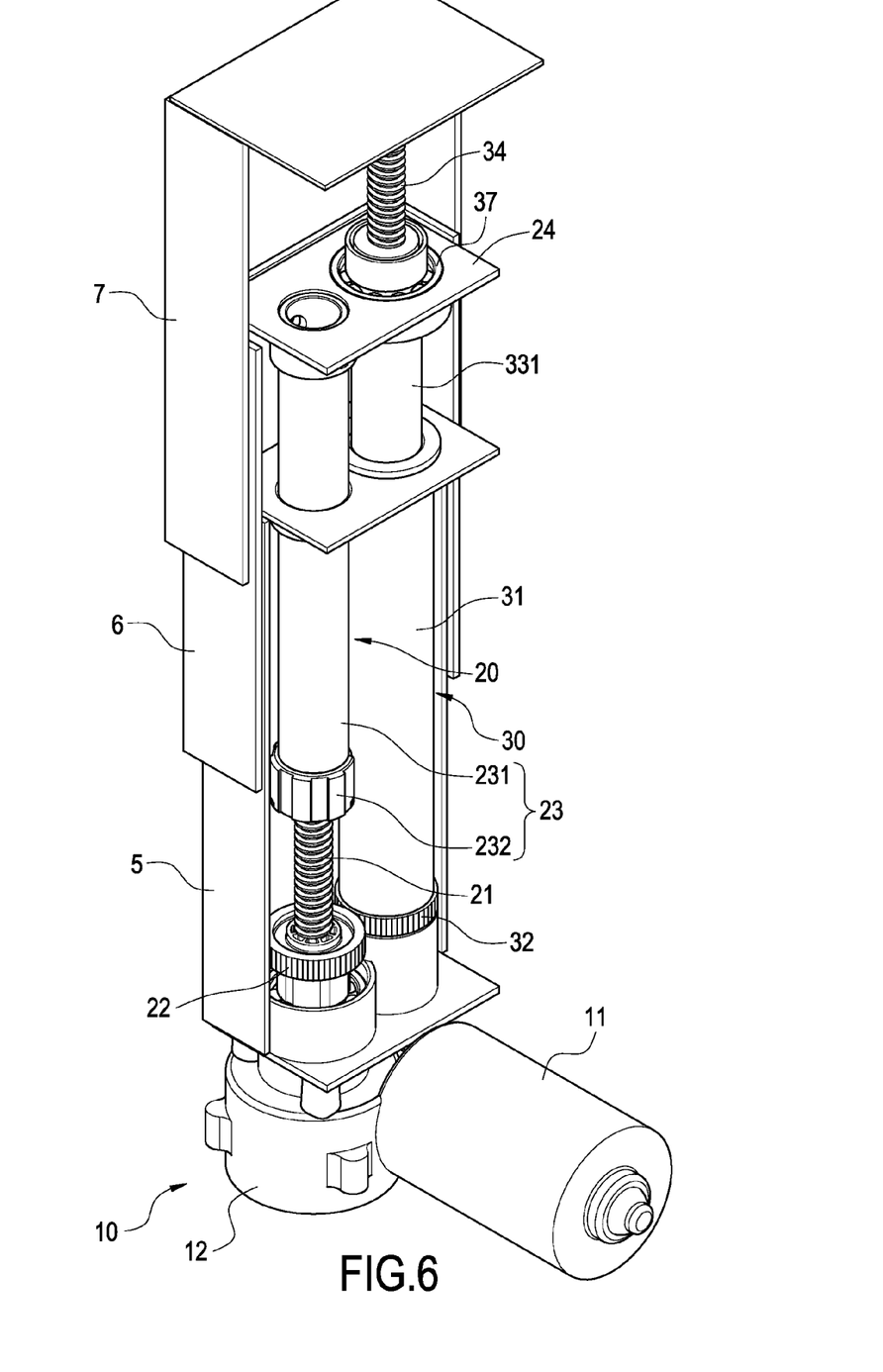
FIG. 6 is an assembled view showing the external appearance of the second embodiment of the present invention.
Figure 7:
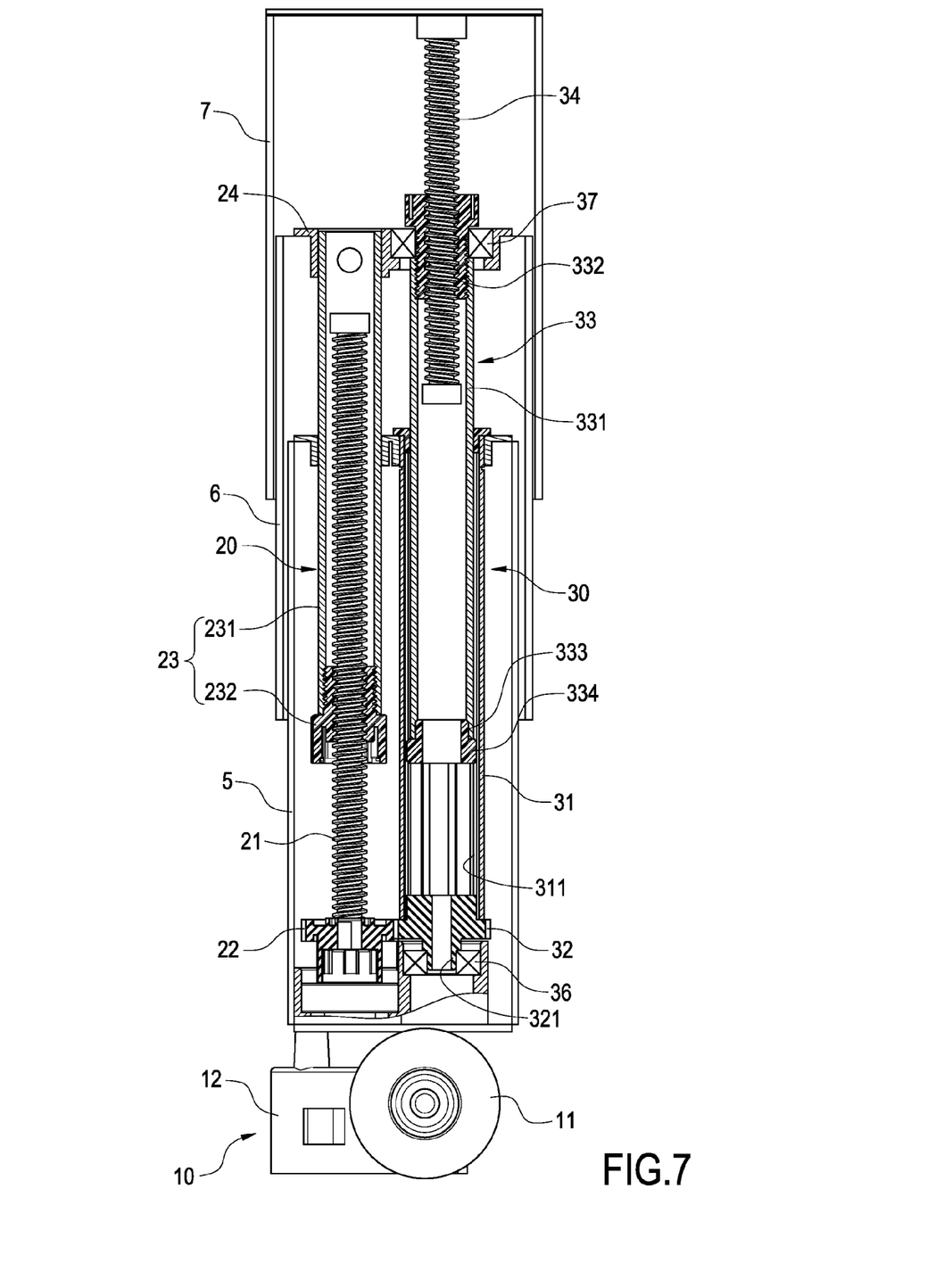
FIG. 7 is a longitudinal cross-sectional view showing the assembling of the second embodiment of the present invention.

With reference to FIGS. 6 and 7, the second embodiment of the present invention is shown. In addition to the aspect shown in the above embodiment, the driving means 10 of the present invention can has the motor 11 fixedly connected to one side of the base body 12 and the transmission shaft 111 penetrating into the base body 12 so as to drive the screw rod 21 of the first transmission means 20 to rotate. The screw rod 21 also drives the first gear 22 fixedly connected to its one end to rotate. Further, the first gear 22 and the second gear 32 of the second transmission means 30 engage with each other. A protruding shaft 321 extends outwardly from the bottom of the second gear 32. The protruding shaft 321 is fixed on the base body 12 of the driving means 10 via the lower bearing 36, so that the first gear 22 can simultaneously drive the sleeve 31 of the second transmission means 30 to rotate. As a result, the lifting device can be partially changed according to the requirements of various products so as to increase its field of application.

Figure 8:
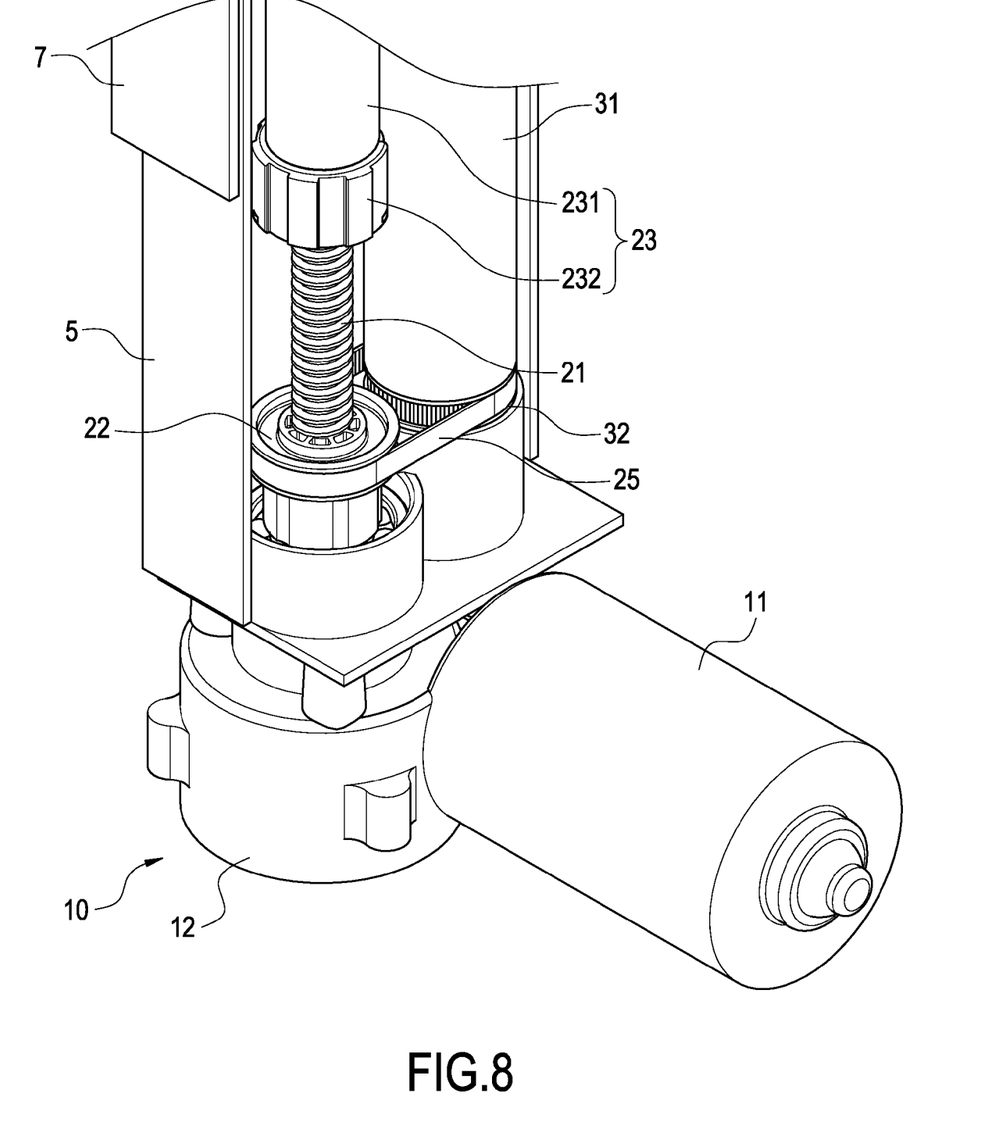
FIG. 8 is an assembled view showing the external appearance of the third embodiment of the present invention.

With reference to FIG. 8, it shows the third embodiment of the present invention. In addition to the aspect of the above embodiment, the transmission between the first transmission means 20 and the second transmission means 30 of the present invention can be achieved by the driving of a belt 25 between the first gear 22 of the first transmission means 20 and the second gear 32 of the second transmission means 30, thereby to reduce the unfavorable noise.

Figure 9:
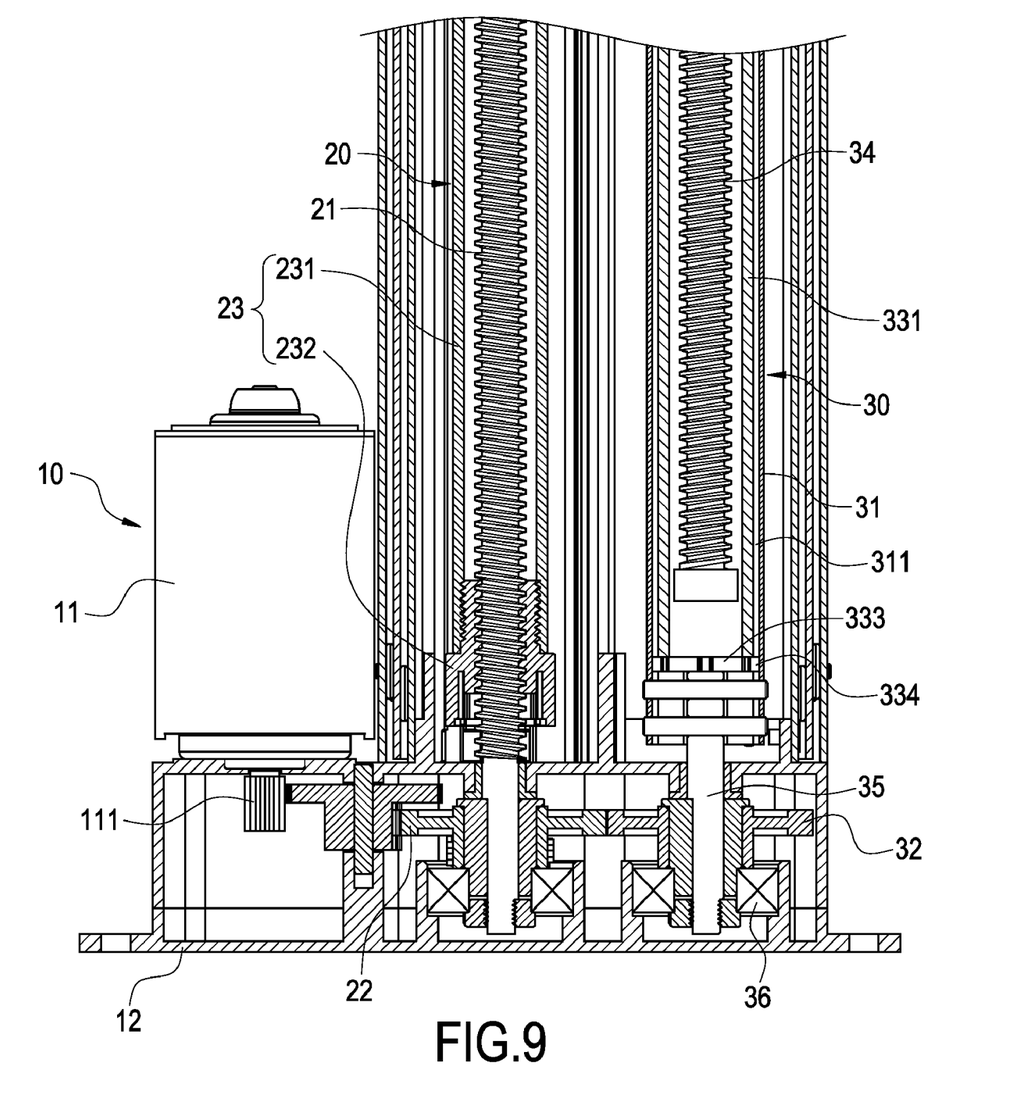
FIG. 9 is a longitudinal cross-sectional view showing the assembling of the fourth embodiment of the present invention.

With reference to FIG. 9, it shows the fourth embodiment of the present invention. The driving means 10 of the present invention can be arranged to be vertical to the first transmission means 20 and the second transmission means 30. In addition, it can be arranged to be parallel to the first transmission means 20 and the second transmission means 30. Since the transmission shaft 111 of the motor 11 indirectly drives the first gear 22 of the first transmission means 20 via an idle wheel, and the first gear 22 directly engages with the second gear 32 of the second transmission means 30, the same effect of transmission can be achieved as that in previous embodiments. Further, the transverse width of the lifting device can be greatly reduced.

According to the above, the lifting device having parallel double screw rods of the present invention indeed has industrial applicability, novelty and inventive steps. Further, since the construction of the present invention has not been used in any products of the same kind or in public or published prior to applying for patent. Therefore, the present invention completely conforms to the requirements for a utility model patent.

Although the present invention has been described with reference to the foregoing preferred embodiments, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A lifting device having parallel double screw rods, the lifting device connected respectively to a first, a second and a third sliding units interconnecting with each other so as to control the relative sliding movement among each sliding unit, comprising:
   a driving means fixedly connected to one end of the first sliding unit;
   a first transmission means comprising a first screw rod fixed to one end of the first sliding unit and a first telescopic tube assembly threadedly connected to the first screw rod and linearly movable relative to the first screw rod, the first screw rod driven by the driving means, a distal end of the first telescopic tube assembly fixedly connected on a connecting piece, the connecting piece further connected to a distal end of the second sliding unit; and
   a second transmission means provided at one side of the first transmission means and parallel thereto, the second transmission means comprising a sleeve driven by the driving means to rotate, a second telescopic tube assembly accommodated within the sleeve and axially movable relative to the sleeve, and a second screw rod threadedly connected to the second telescopic tube assembly and linearly movable relative to the second telescopic tube assembly, an inner wall of the sleeve provided with a plurality of guiding grooves parallel to an axial direction of the sleeve, the second telescopic tube assembly provided with a positioning plug, a plurality of guiding rails protruded from an outer periphery of the positioning plug for slidably mating with each guiding groove, the guiding rails being non-rotatable relative to the guiding grooves, so as to make the second telescopic tube assembly be rotatable with the sleeve, a distal end of the second telescopic tube assembly connected on the connecting piece of the first transmission means, a distal end of the second screw rod fixedly connected on the third sliding unit, wherein the driving means simultaneously drives the second and third sliding units to protrude or retract relative to the first sliding unit.

2. The lifting device having parallel double screw rods according to claim 1, wherein the driving means comprises a motor, a transmission shaft protrudes from the center of the motor, the first transmission means further comprises a first gear fixedly connected to the first screw rod, the second transmission means further comprises a second gear and a connecting rod, the second gear is fixedly connected to one end of the connecting rod, the other end of the connecting piece is fixedly connected on the sleeve, and the first gear and the second gears are driven by the transmission shaft of the driving means to rotate.

3. The lifting device having parallel double screw rods according to claim 1, wherein the first telescopic tube assembly of the first transmission means comprises a telescopic tube and a nut fixedly connected to one end of the telescopic tube, the nut is threadedly connected to the first screw rod of the first transmission means, and the other end of the telescopic tube is fixedly connected to a distal end of the second sliding unit via the connecting piece.

4. A lifting device having parallel double screw rods, comprising:
   a driving means;
   a first transmission means comprising a first screw rod driven by the driving means and a first telescopic tube assembly threadedly connected to the first screw rod and linearly movable relative to the first screw rod, a distal end of the first telescopic tube assembly fixedly connected on a connecting piece; and
   a second transmission means provided at one side of the first transmission means and parallel thereto, the second transmission means comprising a sleeve driven by the driving means to rotate, a second telescopic tube assembly accommodated within the sleeve and axially movable relative to the sleeve, and a second screw rod threadedly connected to the second telescopic tube assembly and linearly movable relative to the second telescopic tube assembly, an inner wall of the sleeve provided with a plurality of guiding grooves parallel to an axial direction of the sleeve, the second telescopic tube assembly provided with a positioning plug, a plurality of guiding rails protruded from an outer periphery of the positioning plug for slidably mating with each guiding groove, the guiding rails being non-rotatable relative to the guiding grooves, so as to make the second telescopic tube assembly be rotatable with the sleeve, one end of the second telescopic tube assembly connected on the connecting piece of the first transmission means, wherein the driving means simultaneously drives the first telescopic tube assembly of the first transmission means and the second telescopic tube assembly and the second screw rod of the second transmission means to protrude or retract relative to the driving means.

5. The lifting device having parallel double screw rods according to claim 4, wherein the driving means comprises a motor, a transmission shaft protrudes from the center of the motor, the first transmission means further comprises a first gear fixedly connected to the first screw rod, the second transmission means further comprises a second gear and a connecting rod, the second gear is fixedly connected to one end of the connecting rod, the other end of the connecting piece is fixedly connected on the sleeve, and the first gear and the second gears are driven by the transmission shaft of the driving means to rotate.

6. The lifting device having parallel double screw rods according to claim 4, wherein the first telescopic tube assembly of the first transmission means comprises a telescopic tube and a nut fixedly connected to one end of the telescopic tube, the nut is threadedly connected to the first screw rod of the first transmission means, and the other end of the telescopic tube is fixedly connected to the connecting piece.

7. A lifting device having parallel double screw rods, comprising:

a driving means;

a first transmission means comprising a first screw rod driven by the driving means and a first telescopic tube assembly threadedly connected to the first screw rod and linearly movable relative to the first screw rod, a distal end of the first telescopic tube assembly fixedly connected on a connecting piece; and a second transmission means provided at one side of the first transmission means and parallel thereto, the second transmission means comprising a sleeve driven by the first transmission means to rotate, a second telescopic tube assembly accommodated within the sleeve and axially movable relative to the sleeve, and a second screw rod threadedly connected to the second telescopic tube assembly and linearly movable relative to the second telescopic tube assembly, an inner wall of the sleeve provided with a plurality of guiding grooves parallel to an axial direction of the sleeve, the second telescopic tube assembly provided with a positioning plug, a plurality of guiding rails protruded from an outer periphery of the positioning plug for slidably mating with each guiding groove, the guiding rails being non-rotatable relative to the guiding grooves, so as to make the second telescopic tube assembly be rotatable with the sleeve, one end of the second telescopic tube assembly connected on the connecting piece of the first transmission means, wherein the driving means simultaneously drives the first telescopic tube assembly of the first transmission means and the second telescopic tube assembly and the second screw rod of the second transmission means to protrude or retract relative to the driving means.

8. The lifting device having parallel double screw rods according to claim 7, wherein the driving means comprises a motor, a transmission shaft protrudes from the center of the motor, the first transmission means further comprises a first gear fixedly connected to the first screw rod, the second transmission means further comprises a second gear fixedly connected to a bottom of the sleeve, the transmission shaft drives the first screw rod of the first transmission means to rotate and drives the second gear via the first gear.

9. The lifting device having parallel double screw rods according to claim 8, wherein the transmission between the first gear and the second gear is either by direct engagement or by driving of a belt.

10. The lifting device having parallel double screw rods according to claim 8, wherein a protruding shaft extends from a bottom of the second gear, the protruding shaft is fixed on the driving means via a lower bearing, and the first gear simultaneously drives the sleeve of the second transmission means to rotate.

11. The lifting device having parallel double screw rods according to claim 7, wherein the first telescopic tube assembly of the first transmission means comprises a telescopic tube and a nut fixedly connected to one end of the telescopic tube, the nut is threadedly connected to the first screw rod of the first transmission means, and the other end of the telescopic tube is fixedly connected to the connecting piece.

12. The lifting device having parallel double screw rods according to claim 7, wherein the driving means and the first transmission means are arranged to be vertical to each other or parallel to each other.

\* \* \* \* \*